ASSOCIATIVE MEMORY WITH HIGH, LOW AND EQUAL SEARCH

Filed July 11, 1968 3 Sheets-Sheet 1

INVENTOR
ROBERT W. MURPHY

BY W. Robertson
ATTORNEY

United States Patent Office 3,533,085

Patented Oct. 6, 1970

3,533,085
ASSOCIATIVE MEMORY WITH HIGH, LOW AND EQUAL SEARCH

Robert W. Murphy, Poughkeepsie, N.Y., assignor to International Business Machines Corporation, Armonk, N.Y., a corporation of New York Filed July 11, 1968, Ser. No. 744,109

Int. Cl. G11c *15/00*

U.S. Cl. 340—172.5 14 Claims

ABSTRACT OF THE DISCLOSURE

This invention provides an associative memory with improved means for searching the memory for all words that are higher, lower, or equal to a search word. The memory has an array of storage cells located at the intersections of word wires and bit wires. In addition, the memory has diagonal word wires that are energizable to control operations along selected diagonals of the memory. With this arrangement, a data word of $n$ bits is stored in the memory in a group of $n+1$ word locations in a form that facilitates high, low, or equal searches. The memory is also adaptable to other logic operations such as addition and subtraction.

INTRODUCTION

Although associative memories are well known, the following description of a typical associative memory will be a helpful introduction to the features and terminology that particularly apply to this invention. A typical associative memory has storage cells arranged in rows and columns. Each storage cell can be set to either of two states to store a binary one or zero. In a specific circuit that will be described later, the cells are bistabled transistor circuits. The cells of a particular row form a word of data and the cells of a particular column represent the same bit position in each word. The cells are interconnected along the columns to bit wires and they are interconnected along rows to word wires. (As will be explained later, a bit wire or a word wire may be formed of one wire performing several functions or several wires each performing only particular functions.)

In a store operation, the bit wires are energized according to signals from a register that holds the word of data to be stored. The word wire of the addressed word of the memory is energized to enable the storage cells of the addressed word to switch to the storage states represented by the signals on the associated bit wires.

In a search operation, a search word is stored in the register and the bit wires are energized according to the binary value of the corresponding bit position of the search word. Each storage cell that does not match the corresponding position of the search word produces a mismatch signal for the word even though the word may match the search word at other bit positions. Each word of the memory has a match register that is set in response to a mismatch signal and remains reset in the absence of a mismatch signal and thereby stores the results of the search.

In a read operation, the word wire of the addressed word is energized to cause the associated cells to produce on their bit wires a signal that represents the storage state of the cell. These signals are transferred from the bit wires to registers or other systems associated with the memory array. The addressing is ordinarily based on the results of a previous search and is controlled by the match registers. For operations that produce multiple matches, means are provided for stepping through the memory to read the matched words one at a time in a predetermined sequence.

As the typical memory has been described so far, a search identifies one or more memory words that match a search word. Associative memories are also useful in performing searches for stored words that are higher than the search word or lower than the search word. An object of this invention is to provide a new and improved associative memory having this capability.

THE INVENTION

According to this invention, an associative memory stores a word of $n$ bits in $n+1$ word locations in a form that facilitates a high, low, or equal search. The memory uses a third storage state that will be designated X and results in a match with either a one or a zero in the corresponding position of the search word. For example, to store the word 1010, the memory would store the original word 1010, a word 0XXX, a word 11XX, a word 100X, and a word 1011. The words 0XXX and 100X define two sets of words that are both lower than the original word and the word 11XX defines a set of words that are higher than the original word. The remaining word in the example, 1011, is higher than the original word.

The five words of the example are stored in a 4 by 5 array of storage cells as follows:

| | | | |
|---|---|---|---|
| 0 | X | X | X |
| 1 | 1 | X | X |
| 1 | 0 | 0 | X |
| 1 | 0 | 1 | 1 |
| 1 | 0 | 1 | 0 |

In this array the lowermost row is the original word. The array is related to the original word along its diagonals as follows:

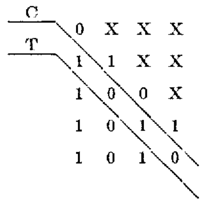

The diagonal labeled C is the complement of the original word. The diagonal to the right of the complement diagonal contain only X terms. The diagonal labeled T is the true value of the original word. The columns below the true diagonal repeat the bit values of the true diagonal.

The associative memory of this invention contains diagonal word lines that control a write operation to take place along the appropriate diagonals of the addressed word group. A write operation takes place in two steps. In one step, the bit wires are energized according to the true value of the original word, all of the row word wires of the addressed word group are energized, and the diagonal wires are energized to permit writing only along the true diagonal and along the diagonals to the left of the true diagonal. In the other step, the bit wires are energized according to the complement of the original word, all of the word wires are energized, and the diagonal word wires are energized to permit a write operation only along the complement diagonal.

During a search operation one and only one word of each word group will product a match. In the preferred embodiment of the invention this word is conventionally read from the memory and is then tested to determine whether it is high, low, or equal to the search word.

In the example of the original word 1010, the uppermost row is lower than the original word, the next row is high, the next row low, and the next to the last row is high. Except for the fact that the lowermost row is always the original word, there is no general relationship between the position of a row and whether it signifies a high or low relationship to the original word. For example, for the original word 0000, all of the related words are higher.

For the three uppermost rows, the rightmost one or zero term signifies whether the term is higher or lower than the search word. For example, in the row 0XXX, the zero term signifies that the set of words defined by the word 0XXX are all lower than the original word. (The word 0XXX defines a set of numbers from 0000 to 0111 and thus there is a definite high or low relationship only to numbers outside this set, in this case to higher numbers.) Thus the match signifies that the original word is higher than the search word. A leftmost one in one of the three upper rows similarly signifies that the original word is lower than the search word. The associative memory of this invention has means for interrogating the rightmost one or zero term to detect whether the original word is higher or lower than the search word.

The memory also has means from for distinguishing between the original word and the word of the next to the last row. These differ only in their rightmost bit position and the bit values alone do not signify whether the word is the original word or the word of the next to the last row. This bit position is compared with the rightmost bit position of the search word; if the terms agree, the original word equals the search word, if they do not agree, a one in the search word signifies that the original word is low and the zero signifies that the original word is high.

In summary, this invention provides a high, low, or equal search capability in an associative memory that has a minimum of circuits over a conventional associative memory. The memory is particularly useful as an indicator for associatively addressing a longer memory word that is located in an additional storage and is identified by the word group. The high, low, equal capability is useful in other logic functions and a memory adapted for addition and subtraction will be described later.

The foregoing and other objects, features and advantages of the invention will be apparent from the following more particular description of a preferred embodiment of the invention, as illustrated in the accompanying drawings.

THE DRAWING

THE PREFERRED EMBODIMENT

Figure 1:
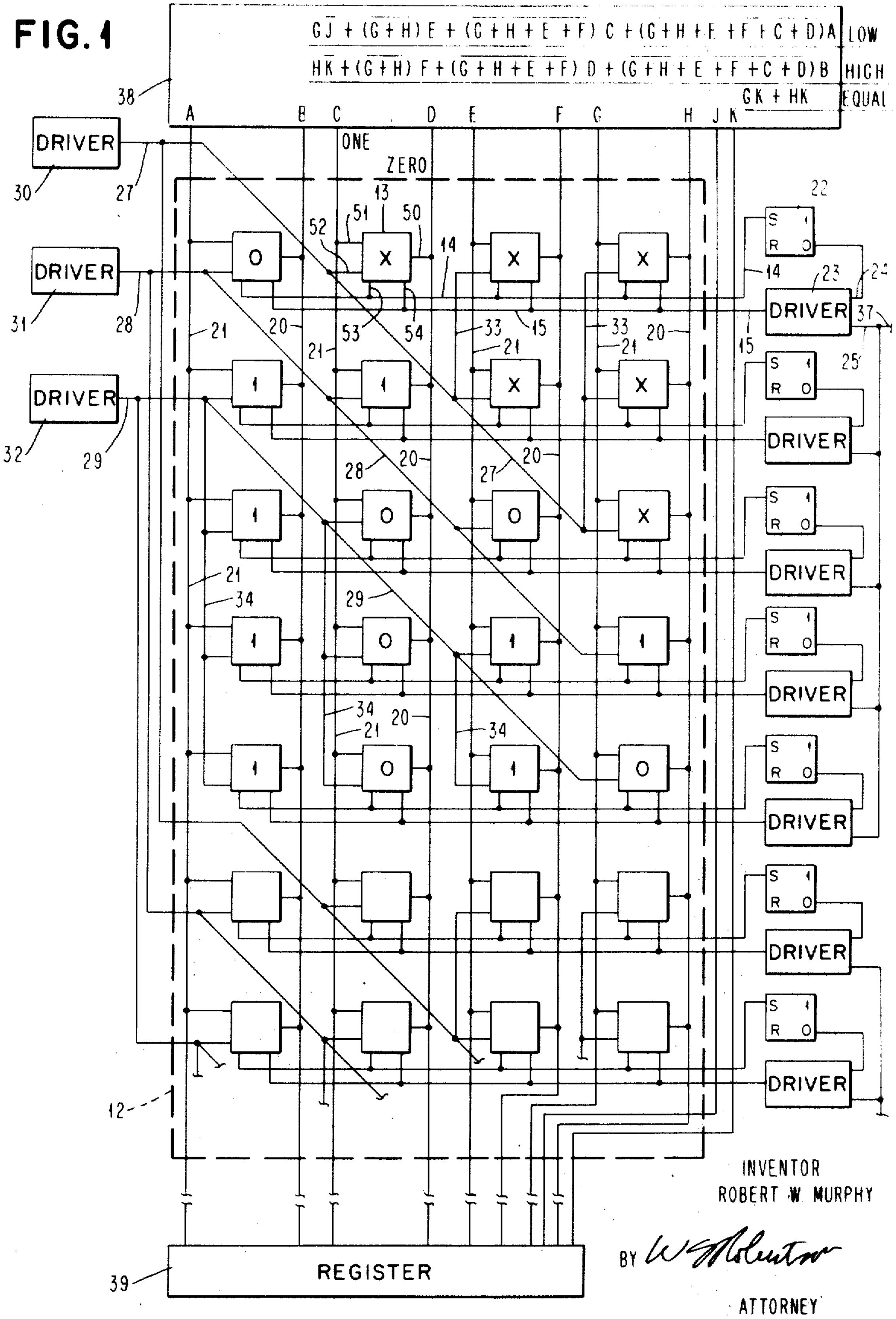
FIG. 1 is a diagrammatic showing of the preferred associative memory of this invention.
Figure 2:
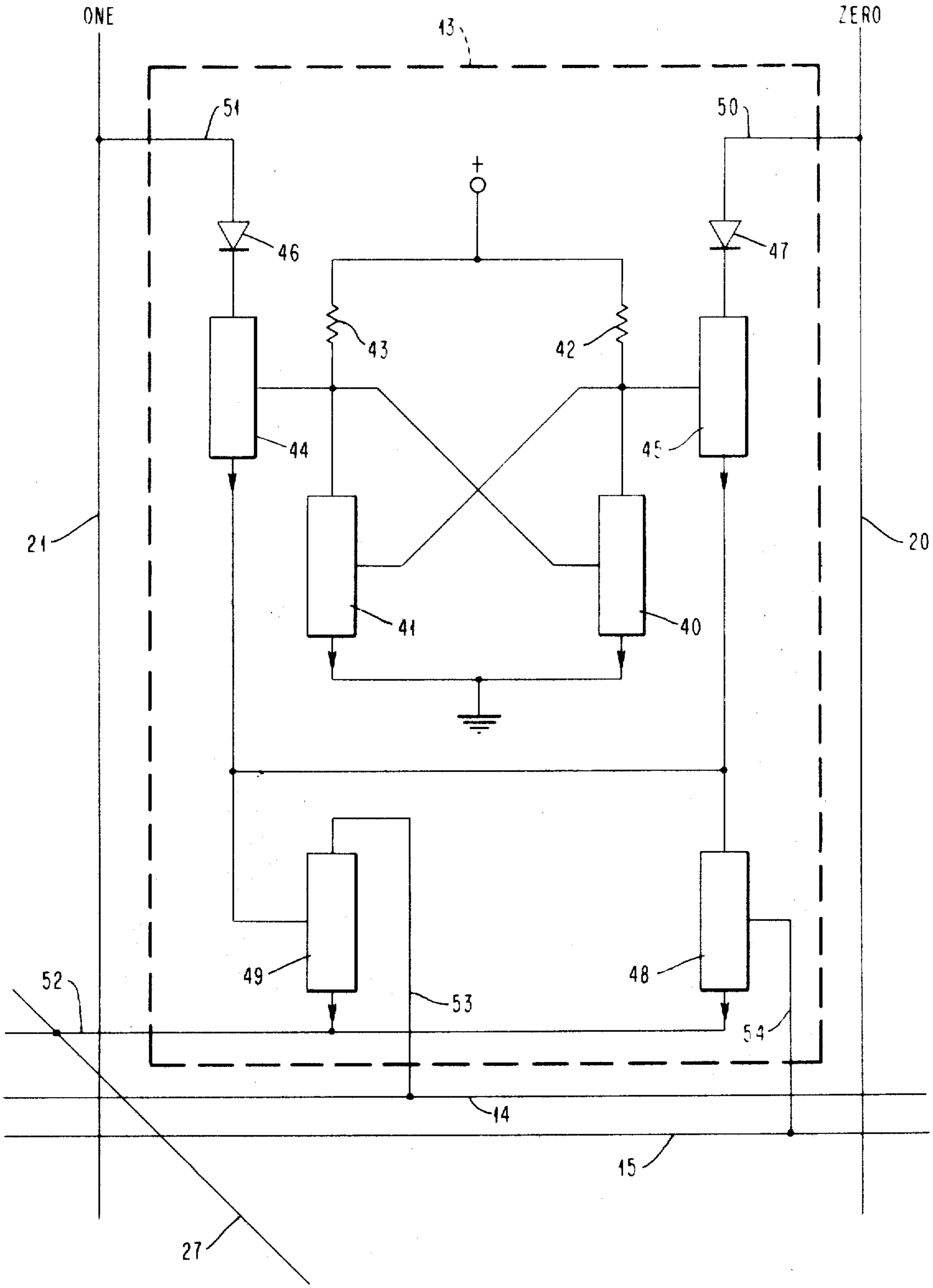
FIG. 2 is a schematic of an associative memory storage cell that is useful in the preferred memory.

It will be helpful to consider first the conventional features of the associative memory of the drawing with an introductory reference to features that are new, to then consider the preferred storage cell of FIG. 2, and then the more specific features of the invention as it is shown in FIG. 1 and as it might otherwise be embodied.

Introduction.—The memory includes an array 12 that is enclosed in a dashed line box. In the array, storage cells 13 are arranged in rows that define words and in columns that define bit positions. The storage cells of the same word are connected to a common wire 14 that functions as a word sense wire and carries mismatch signals from the cells during a search operation. The cells of the same word are also connected to a common wire 15 that functions as a word drive wire and carries the signals to select a word of the memory for a store operation or a read operation. Bit wires extending in the column direction are formed by two wires 20, 21 for each bit position. Wires 20 are labeled zero in the drawing and during a read operation, wires 20 carry a signal representing that the associated bit position of the addressed word is in a zero storing state. Wires 20 are energized for either storing a one in the corresponding position or for searching for ones in the corresponding bit position. Wires 21 similarly function for storing, and searching for zeros and for reading a one.

For each word sense wire 14 there is a match register 22 that has a set input connected to receive a mismatch signal on its word sense wire. The match registers are also provided with reset inputs that are connected (by wires not shown) to conventional circuits for resetting the match registers to begin a search. Each match register has two output terminals at which signals appear representing the one or zero storage state of the register and the mismatch or match result of a search.

For each word a driver 23 is connected to produce voltages on the drive wire 15 of an addressed word for read and store operations. Each driver 23 has an input 24 that is connected to receive a signal from the associated match register and an input 25 that is connected to receive addressing and timing signals. These inputs provide an AND logic function and control the driver to permit reading words matched on a previous search operation and to store data in words in locations selected by conventional circuits (not shown) that are associated with the input terminals 25. Conventional means (not shown) is also associated with the input terminals 25 for reading multiple matches in a predetermined sequence.

According to this invention the memory is organized with groups of five words for each original four bit word stored in the memory. The drawing shows the cells for one word group of five words, and the cells are marked with 1, 0, and X to show the storage contents for the original word 1010. This invention provides three sets of diagonal word drive wires 27, 28, 29 for each word group. Each diagonal wire is connected to a driver 30, 31, 32. Wires 33 connect diagonal wire 27 to other cells forming a triangular array. Wires 34 connect diagonal wire 29 to other cells forming another triangular array. The drawing also shows two words of the next word group to indicate the interconnections between word groups.

Store operations take place in the five word locations of a word group and as the invention is shown in FIG. 1, there is a common input 37 for supplying store and write signals to the terminals 25 of a related group of word drivers. During a read operation, only the matched word receives signals at both its terminals 24 and 25. During a store operation (when the match registers are all reset) each of the drivers of the addressed word group is turned on and the storage locations are selected by the diagonal word wires.

According to this invention, a logic circuit 38 is provided to detect whether a word read from the memory is higher, lower, or equal to the search word. A register 39 for applying the store and search words to the bit wires is adapted to selectively provide the true or the complement of its contents.

The storage cell of FIG. 2.—The associative storage cell of FIG. 2 is based on a storage cell that is described in detail in U.S. Pat. 3,354,440 to A. S. Farber and E. S. Schlig. Transistors 40 and 41 are interconnected with resistors 42 and 43 between two potential points to form a bistable circuit. Transistor 40 conducts to store a binary one and transistor 41 conducts to store a binary zero. In this circuit the base terminal of each transistor is connected to the collector terminals of the other transistor; thus the collector terminals are input terminals for receiving signals from the bit wires 20, 21 for search operations and store operations and they are output terminals for producing signals on wires 20 and 21 during a read operation.

The collector terminals of transistors 44 and 45 are coupled to bit wires 20, 21 such that signals on the bit wires permit a selected one of transistors 44, 45 to conduct during search operations and to be turned on during store operations and such that signals from the cell appear on one of the bit wires during a read operation. The emitter terminals of transistors 44, 45 are connected together and are conductively connected to diagonal drive wire 27 (or 28 or 29) through the parallel combination of the emitter-collector circuit of a transistor 48 and the base-emitter circuit of a transistor 49. The diagonal word wire 33 is made suitably negative to permit operation of the cell or it is made suitably positive to inhibit operation. Transistor 48 has its base terminal connected to the word drive wire 15 and during a store or read operation it receives a suitable base potential to conduct in circuit with either transistor 44 or transistor 45.

During a read operation transistor 48 is turned on to permit conduction of transistor 44 or 45. The transistor 40 or 41, whichever is off, and has the more positive collector terminal, controls its associated transistor 45 or 44 to turn on and to produce a signal on the wire 20 or 21. During a store operation, one or the other of transistors 44, 45 is given a suitable collector potential to control the associated transistor 41 or 40 to turn on or to remain conducting and the other transistor to turn off or to remain off. During a search operation a signal is applied to either wire 20 or 21. If the corresponding transistor 44, 45 is conditioned for conduction by the state of transistors 40, 41, the transistor of the selected bit wire turns on and supplies base current to transistor 49. Transistor 49 turns on and produces a mismatch signal on word sense wire 14. If the transistor 44, 45 is not conditioned for conduction, transistor 49 does not turn on to produce a mismatch signal.

THE MEMORY OF FIG. 1

The preferred memory will be more fully understood when the components of FIG. 1 are considered as they operate in a sequence of store, search, and read operations.

Store.—Suppose that the five word group shown in FIG. 1 is to store the data that is shown in the drawing. First, the match registers 22 are all reset (or the drivers 23 are otherwise conditioned to respond to a store signal on line 37). The original word, 1010, is stored in register 39 and the appropriate bit wire 20 or 21 for each bit position is energized according to the corresponding stage of the register. The bit signals appear at one or the other of the inputs 50, 51 of each cell of the memory, but the cells do not respond to the bit signals in the absence of appropriate signals on the row drive wires 15 and the diagonal drive wires 27, 28, and 29. The five drivers 23 for the addressed word group are turned on and the diagonal word wire 29 is energized to permit a store operation in the triangular array of cells connected to this wire. The diagonal wire 28 is controlled to inhibit a store operation along its diagonal.

The register is then operated to produce the complement of the original word on the bit lines, the row drive wires are energized, and the diagonal drivers 28 and 29 are controlled to permit the complement of the word to be stored only along the diagonal of wire 28.

With ordinary binary storage cells, the X storing cells do not function in the memory and it is immaterial whether they store ones or zeros.

Search.—In a search operation, a search word is stored in register 39 and the bit wires 20, 21 are energized to produce a signal on the word sense line 14 for any cell that does not match the corresponding bit position of the search word. Diagonal word wires 28 and 29 are energized to permit the search operation, and the diagonal wire 27 is energized to inhibit the X storage cells from producing a mismatch signal on the word sense wires. In response to a mismatch signal, the associated match register 22 is set to energize its 1 output and to deenergize its 0 output. In each search operation, a single one of the match registers will remain at its reset stage and thereby will enable the associated driver 23 to operate on a forthcoming operation.

Read.—In a read operation the addressing wires 37 of each word group are energized in sequence and the matched words are individually read from the array. The diagonal wire 27 is energized to inhibit signals from the X storage cells and diagonal wires 28 and 29 are energized to enable the read operation on the one and zero storing cells. Thus signals appear on one of the wires 20 or 21 to signify the one or zero storage states and the absence of signals signifies the X storage state. These signals are supplied to the logic circuit 38 which detects a high, low, or equal condition.

Details of logic circuit 38 are shown in algebraic form because suitable individual logic circuits for the logic function or an equivalent function are well known. The bit wires are labeled A through H. Two wires labeled J and K are supplied from the rightmost bit position of the register 39 and one or the other of these wires is energized to signify that the rightmost bit of the search word is a one or a zero.

A signal on either wire G or H signifies that the matched word is either the last word of the word group or the next to the last word in the word group. If the rightmost bit of both the search word and the matched word are identical, the matched word is the original word. Thus the logic function $GJ+HK=1$ signifies that the matched word equals the searched word. When this condition is detected, circuit 38 energizes its Equal output line.

If a signal exists on wire G or H but does not match the signal on wire J or K, the matched word is the next to the last word of the word group and the original word is either higher or lower than the search word. As the example illustrates, a one in the rightmost bit position of the matched word signifies that the matched word is higher than the original word (1011 is higher than the original word 1010), or conversely that the original word is lower than the search word. Thus the logic circuit for energizing the low output of block 38 contains the term $G\overline{J}$ and the logic for the high output contains the term $H\overline{K}$.

A signal on either wire G or H also signifies that the output of block 38 is to be independent of signals on wires A through F. The logic for the low output contains the term $\overline{(G+H)}$ which is logically combined with each of the terms E, C, and A to inhibit these terms from producing a false output at the high output terminal. Similarly the term $\overline{(G+H)}$ is ANDed with the terms E, C, and A to prevent false output at the low output terminal.

Thus in response to a match with a last word or the next to the last word of a word group, the logic circuit 38 will produce a high, low, or equal output. Suppose that the matched word contains an X in the rightmost position and contains a one or zero in the next to the rightmost position, in the example, the word 100X. Neither of the wires G or H carries a signal. If wire F carries a signal (as in the example 100X), the original word is higher than the search word. Logic circuits represented by the expression $\overline{(G+H)}E$ produce a signal at the high output terminal of circuit 38. The circuits represented by the expression $\overline{(G+H)}F$ similarly provide a signal at the low output terminal of circuit 38 when the next to the rightmost bit is a one.

A signal on either wire E or F also signifies that operation on the terms A, B, C and D is to be inhibited to prevent a false output, and the term $\overline{(E+F)}$ appears in all terms having inputs from these bit positions. The circuit for generating a high or low output where match occurs with the other words of the word group will be apparent from the drawing and from the preceding description of the operation on the matched word 100X.

Subsequent operations.—At the end of a read operation, logic block 38 produces an output signifying that the original word of the word group is high, low, or equal to the search word. The circuitry for producing the addressing signal on wire 37 indicates the particular word group that the detector output applies to. As has been explained in the introductory explanation of the invention, this information is useful for identifying a location of additional storage not shown in the drawing and for operating on the word stored in that location. An operation on this word of additional storage may lead to a store operation to modify the addressed word of the associative memory or the memory may proceed to read the next matched word and leave the previously matched word unchanged.

OTHER EMBODIMENTS

In the preferred embodiment, the array differs from the conventional array as little as practical and additional circuits and operations are provided to achieve the high, low, and equal search. Various modifications of this associative memory can be achieved within the spirit of the invention and the scope of the claims by constructing the array to perform some of the logic functions that in the preferred memory are performed by circuits outside the array.

In the memory of the drawing, the function of providing both the true and complement values of the original word are provided by the register 39 and by timing the store operation to take place in separate steps for the true and complement values. With a somewhat modified storage cell the function of storing the true and complement values can be performed in the cell, and the store operation can be performed in a single step. For example, the cells can be made to respond to a diagonal word wires 28 and 29 to selectively store the complement or the true value of the word in register 39.

In the preferred memory, the function detecting whether the matched word is high, low, or equal is performed outside the array by the logic circuit 38. The array can provide this function directly: the lowermost word in the word group is always equal when it is matched; the next to the lowermost word is higher or lower than the original word according to whether its rightmost bit is a one or a zero; similarly the remaining words of a word group are higher or lower than the original word as indicated by the one or zero storage state of a specific cell that can be permanently wired to produce an appropriate high or low indicating signal. When the detection logic is provided in the array, the array can be further modified to produce a match or a subsequent read operation only when the original word has a preselected high, low, or equal relationship to the search word.

As the operation of this memory has been explained so far, each word group does not represent data that is useful outside the memory but identifies a word location in additional storage that is accessible when the matched word of the word group is read. This invention is also useful where the original word itself is to be read. The original word can be duplicated in the additional storage location or the array can be constructed for direct read out of the original word of the matched word group.

Figure 3:
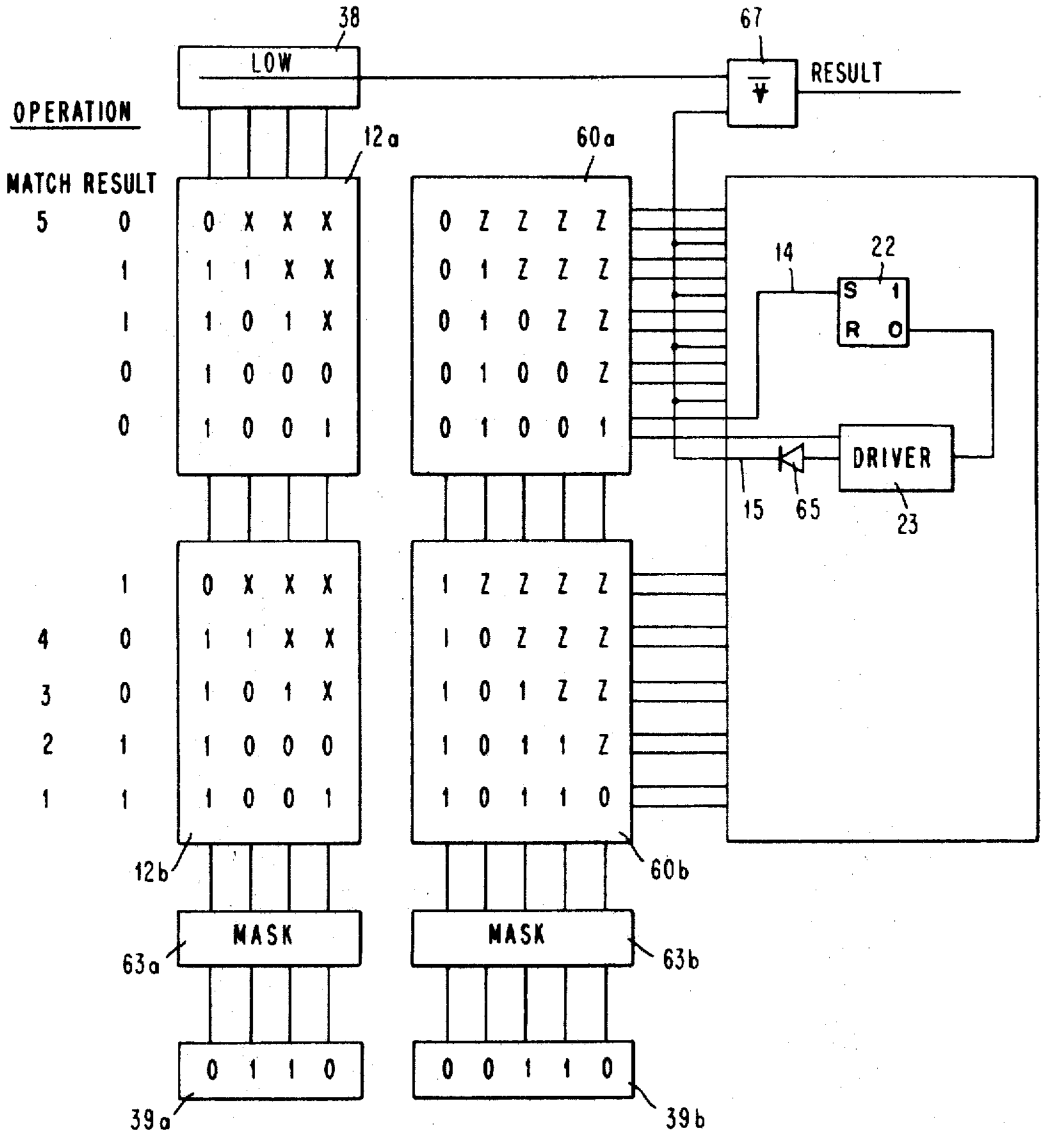
FIG. 3 is a diagrammatic showing of the memory of this invention in an embodiment that performs addition and subtraction

The embodiment of FIG. 3.—The high, low, equal search capability of this memory is useful for subtracting the search word from each word of the memory. The subtraction operation proceeds bit by bit from the high order to the low order (or in any arbitrary order), and in the operation at each bit position there are (in effect) two steps. One step is the Exclusive OR operation on a particular bit position that will be called the operating position. In the other step the high, low, equal search operation already described is performed in a way that tells whether the bit positions to the right of the operating position produce a borrow into the operating position. If a borrow occurs, the result of the Exclusive OR operation is complemented to produce the result for the operating position.

Since the storage cells and their interconnections to the bit and word wires have been explained in the description of the memory of FIG. 1, these components are represented in FIG. 3 by a corresponding array of numbers that represent an original word 1001. The four by five word group for the original word is stored in duplicate arrays **12*a* and 12*b*. For each four bit word in arrays 12*a*, 12*b* there is a five bit word in arrays 60*a*, 60*b*, that is connected to the same word sense wire 14 to register mismatches in the same register 22. The blocks enclosing the arrays represent functional but not necessarily structural distinctions of the four arrays. Arrays 12*a*, 12*b* are searched to perform the borrow operation and arrays 60*a*, 60*b*** are searched to perform the Exclusive OR operation. The other components that cooperate with the arrays will be explained as they appear in the following example of a subtraction operation.

In the example of the drawing, a search word 0110 is held in a search register **39*a* and is to be subtracted from the word 1001 and other words of the memory that are not shown. A table of this particular operation is shown to the left of the arrays in FIG. 3. The Result column shows the result of any subtraction that produces a match in the corresponding row. This result appears at the output of a circuit 67**, described later. The match column shows the bit position of the result for the particular example of FIG. 3 in the same row as the matched word of the arrays. In this example, successive matches occur in different words, but successive matches may occur in the same word.

As the list of matches in FIG. 3 shows, the result of subtracting two four bit numbers in a five-bit number. In the fifth bit position a one signifies that the result is negative and is in two's complement form and a zero signifies that the result is positive and in its true form. (As will be explained later, the fifth bit position of arrays **60*a*, 60*b*** provides for negative sign for the word in the search register.)

A conventional mask register **63*a* is arranged to transmit a selected number of rightmost bit positions of the search word to arrays 12*a*, 12*b*. In the operation of finding the borrow into the fifth bit position, all positions are unmasked and the operation is similar to the operation described for the memory of FIG. 1. In the example of the drawing, the stored word 1001 is larger than the search word 0110 and there is no borrow into the fifth position. On search, a match occurs with the word 0XXX (in array 12*a* as is explained later). The word 0XXX is read and is detected in circuit 38 as signifying that the original word is higher than the search word. An equal match would, of course, have the same significance in the borrow operation, and a low match would indicate a borrow. The output of circuit signifies the borrow or no borrow result of this search and in the specific logic of FIG. 3 a one at the output of circuit 38** signifies a borrow.

An Exclusive OR circuit 67 is connected to receive the borrow signal and to receive the results of the Exclusive OR operation carried out at the operating position in arrays **63*a*, 63*b*** and to produce the result for the operating position.

During the operation on arrays **12*a*, 12*b* just described, a mask register 63*b* and a search register 39*b* cooperate to perform a search on only the fifth bit position of arrays 60*a*, 60*b*. The search register 39*b* contains the search word 00110 in which the zero in the fifth bit position signifies that the number is positive and the other positions are the same as the search word in register 39*a*. The upper array 60*a* contains, in part, the original word. Thus a match in the upper arrays 12*a*, 60*a* signifies that the Exclusive OR function of the search word and the stored word is a zero. The lower array 60*b*** contains, in part, complementary values so that a match signifies that the Exclusive OR function is one for the unmasked position.

Circuitry is provided for supplying a one signifying input to the Exclusive OR circuit 67 in response to the setting of a match register 22 for any word of the upper arrays 12*a*, 63*a*. Each driver 23 has its output coupled through an isolating element 65 to a common input line to circuit 67. Since this input is the complement of the Exclusive OR function, circuit 67 is arranged to provide the complement Exclusive OR operation. Thus the output of circuit 67 is the result of the subtraction for the operating position.

The fifth bit position of arrays 60*a* contains zeros in each row to produce a match when the search word is positive, and the fifth bit position of array 60*b* contains ones in each row to produce a match when the search word is negative.

In the operation for the fourth bit position of the result, the mask register portion 63*a* is operated to search on the three rightmost bit positions of arrays 12*a*, 12*b*. As the table of operation shows, this operation produces a match with portion 1XX of the full word 11XX in array 12*b*. When this word is read, circuit 38 signifies that the rightmost three bits of the original word are less than the rightmost three bits of the search word and that a borrow occurs into the fourth position of the result.

The words 0XX in arays 12*a*, 12*b* are masked to prevent a match that would otherwise occur if only the three rightmost bits of these words were searched. In arrays 63*a*, 63*b*, the fourth bit position for these words is given a permanent mismatch state that is designated Z in the drawing. A mismatch state can be provided by establishing a conductive path from each bit sense wire to the word sense wire at the mismatch location. A mismatch can also be provided by pairs of bistable circuits that are separately coupled to a bit wire and are set to storage states to produce mismatch signals when either bit wire is interrogated. The Z terms are located elsewhere in arrays 63*a*, 63*b* to produce mismatches where only X terms appear in any unmasked portion of a word of arrays 12*a*, 12*b*.

The operation table in FIG. 3 shows the steps of finding the results for the other positions of the result. The operations for positions three and two duplicate the operation that has been described for position four. Since the result for position one is a simple Exclusive OR function of the rightmost bit of the search word and the stored word, the operation for position one takes place with the register portion 39*a* fully masked. The zero level output of circuit 38 correctly provides an input to circuit 68 for this operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an associative memory having storage cells arranged to form words, means to search along bit positions of the memory for match or mismatch conditions with a search word, means to sense mismatches in the word dimension and means to register mismatches for each word, wherein the improvement comprises, means to store each original word of $n$ bits as a word group of $n+1$ word locations using permanent match states for predetermined bit positions to define sets of numbers that are high, low, or equal to the original word, and means responsive to a match with any word of a word group for signaling thehigh, low, or equal state of the original word with respect to the search word.

2. An associative memory according to claim 1 in which said means responsive to a match includes means responsive to the low order one or zero bit of a matched word for signaling the high, low, or equal state of the original word with respect to the search word.

3. An associative memory according to claim 2 in which said means responsive to the low order one or zero bit of a matched word includes means responsive to the low order bit position of the search word and of words having no permanent match states to distinguish an equal state from a high or low state.

4. An associative memory according to claim 3 in which said means responsive to a match includes means to read each matched word separately and means to detect the low order one or zero bit of words having permanent match states and means to compare the low order bit position of said matched word with the low order bit position of the search word.

5. An associative memory according to claim 1 in which said means to store each original word includes a first diagonal wire controlling a complementary store operation to take place in $n$ cells along said diagonal and a second parallel diagonal wire controlling a true store operation to take place in the $n$ cells along said second diagonal and in other cells forming a triangular array.

6. An associative memory according to claim 5 in which said storage elements are bistable transistor circuits having a pair of bit-sense wires separately carrying one and zero signifying signals and indicating the permanent match state by the absence of a signal on either wire.

7. An associative memory according to claim 6 including a third diagonal wire connecting the permanent match state positions in a triangular array and operable during a read operation to prevent one or zero signifying signals from said permanent match positions.

8. An associative memory comprising storage cells arranged in rows and in $n$ columns and interconnected along columns to bit and sense wires for receiving bit signals during store and search operations and carrying signals from addressed cells during a read operation and interconnected along rows to word addressing and mismatch sensing wires, wherein the improvement comprises, for each word group of $n+1$ word locations, a first diagonal wire interconnecting the $n$ storage cells of the diagonal for controlling read and write operations along said diagonal in cooperation with the other wires, and a second parallel diagonal wire interconnecting the $n$ storage cells of the diagonal for controlling read and write operations along said second diagonal in cooperation with said other wires.

9. An associative memory according to claim 8 further including means interconnecting selected other cells in a triangular array with the cells of said second diagonal cells to be controlled by said second diagonal wire.

10. An associative memory according to claim 9 including a third diagonal wire interconnecting the other cells of said word group in a triangular array and means to energize said third diagonal to inhibit mismatches during a search operation.

11. An associative memory according to claim 9 including means for energizing said diagonal wires and said other wires for writing a predetermined original word in the bit positions of said triangular array and for writing the complement of said word along said first diagonal, whereby a store operation establishes $n+1$ words defining sets of words that are high, low, or equal to said original word.

12. An associative memory according to claim 11 including a mask register operable for searching selected lower order bit positions to perform a borrow operation, and means to form the Exclusive OR logic function of the next higher order bit position of the search word and the original word for subtracting the search word from the original word.

13. An associative memory according to claim 12 in which said means to perform the Exclusive OR operation comprising a first and second $n+1$ by $n+1$ set of storage cells for storing in part, respectively, said original word of a word group and the complement of said original word and connected to form words with word locations of said word group, an $n+1$ bit search word register for storing said $n$ bit search word and a sign bit, and a mask register for searching on one bit position at a time to produce a match in said first or second set of cells according to the Exclusive OR function of a bit position of said search word and said original word.

14. An associative memory according to claim 13 including in said first and second sets of cells, permanent mismatch cells located to mask words of said $n$ by $n+1$ array that under the masked operation present only permanent match states.

References Cited

UNITED STATES PATENTS

| | | |
|---|---|---|
| 3,195,109 | 7/1965 | Behnke. |
| 3,264,616 | 8/1966 | Lindquist. |
| 3,297,995 | 1/1967 | Koerner et al. |
| 3,402,398 | 9/1968 | Koerner et al. |

PAUL J. HENON, Primary Examiner

S. R. CHIRLIN, Assistant Examiner

U.S. Cl. X.R.

340—173, 174